United States Patent

[11] 3,621,045

[72] Inventors Richard Muller
Radebeul;
Reiner Irmisch, Dresden; Harald Rotzsche,
Dresden, all of Germany
[21] Appl. No. 773,315
[22] Filed Nov. 4, 1968
[45] Patented Nov. 16, 1971
[73] Assignee Insitut fur Silikon und Fluorkarbon-Chemie
Radebeul, Germany

[54] PROCESS FOR THE PREPARATION OF ORGANOFLUOROSILANES
7 Claims, No Drawings

[52] U.S. Cl. .................................................... 260/448.2 E,
260/448.8 R
[51] Int. Cl. ........................................................ C07d 7/12
[50] Field of Search ............................................ 260/448.2
E, 448.8, 448.2 N

[56] References Cited
UNITED STATES PATENTS
3,408,380  10/1968  Pittman et al. ................ 260/448.2 E
OTHER REFERENCES
Voorhoeve, " Organohalosilanes," Elsevier Publishing Co., N.Y. 1967, pps. 56–60.

*Primary Examiner*—Tobias E. Levow
*Assistant Examiner*—P. F. Shaver
*Attorney*—Tab T. Thein ABSTRACT: Process for preparing organofluorosilanes of the general formula $R_a R'_b Si F_{4-(a+b)}$ wherein $a$ represent 0 to 2; $b$ represents 1 to 3; $(a+b)$ is smaller than 4; R represents lower alkyl; R' stands for phenyl, iso-propoxy, trimethylsiloxy and anilino, which process comprises reacting hydrogensilanes of the general formula $R_a R'_b Si H_{4-(a+b)}$ wherein $R_a$, $R'_b$ and $(a+b)$ have the same meaning as above, with ammonium fluoride or ammonium-hydrogen fluoride preferably in a solution of an amine or amide, whereby hydrogen linked to Si is exchanged by F, while the R—Si and R'—Si bonds are unaffected. The so obtained organofluorosilanes are valuable starting products in the synthesis of organosilicon products.

PROCESS FOR THE PREPARATION OF ORGANOFLUOROSILANES

The present invention relates to a process for preparing organofluorosilanes from organosilicon compounds which contain hydrogen directly attached to silicon, through replacing the hydrogen by fluorine. The organofluorosilanes so obtained can then be converted into other organosilicon compounds.

There are a number of known methods for converting hydrogen silanes into fluorosilanes by means of some metal fluorides, such as $SbF_3$, $AsF_3$ and $AgF$, or with anhydrous HF. However, the known methods have the disadvantage that the metal fluorides are not readily available, and that the yields in fluorosilanes are quite low. Moreover, the reaction results in the formation of undesirable byproducts; among other drawbacks, the reaction occurs with the formation of free metal due to the reducing character of the silicon-hydrogen bond; the presence of the free metal makes further processing more difficult.

When in a known process hydrogensilanes are fluorinated with anhydrous hydrogen fluoride, and with e.g., $Cu^{2+}$ salts as catalyst, it is necessary to operate below room temperature and to carry out the reaction in vessels which will not be attacked by hydrogen fluoride; it is also necessary to take special precautions to protect the operators. It is yet another drawback that when silicon-aryl groups are present in the organosilicon compounds containing Si—H groups, undesirable side reactions will happen, namely splitting of the Si—C bonds.

While it was known to chlorinate or brominate some well-defined silicon-chloro compounds or silicon-bromo compounds, for further use in syntheses, similar reactions were not known for fluorine. The reason is obviously the occurrence of cleavage reactions with the above-mentioned fluorinating agents which makes it impossible to maintain intact groups, e.g., such as the siloxy, ($R_3SiO-$), silicon alkoxy- ($-SiOC_2H_5$), silicon aroxy, ($-SiOC_6H_5$), or silicon amino groups ($-SiNH_2$), and so on. With the fluorinating agents used up to now, not only were the Si—H groups fluorinated in such cases but also the Si—OR groups, which was of course an undesired result.

It is therefore an object of the present invention to provide a method for preparing organofluorosilanes, which is free of the above-mentioned shortcomings.

It is another object of the invention to provide a process for replacing in organosilicon compounds containing a Si—H bond the hydrogen by fluorine without causing other undesirable side reactions to occur.

Other objects and advantages of the process according to the invention will be apparent from the following description.

With the above objects in view, the invention contemplates a very simple process, developed for fluorinating compounds having silicon-hydrogen bonds, which due to its gentle action permits to replace the hydrogen by fluorine, while maintaining intact all the other silicon bonds of organohydrogensilanes. The thereby obtained organofluorosilanes may then be used in a similar manner as the above-mentioned bromo-or chlorosilanes, while offering the improvement that organofluorosilanes may be obtained with the novel method according to the invention which could not be made by fluorinating organochloro-or organobromosilanes because such fluorination would cause cleavage of other groups attached to the silicon.

According to the invention the hydrogen is silicon-hydrogen bonds of organosilicon compounds having the general formula $R_a R'_b Si H_{4(a-b)}$ wherein $a$ represents 0 to a 2; $b$ represents 1 to 3; ($a+b$) is smaller than 4; R represents lower alkyl; R' stands for phenyl, iso-propxy, trimethysiloxy and anilino, by reacting said organosilicon compounds with ammonium fluoride and/or ammonium-hydrogen fluoride.

The process is capable of general application and permits to obtain very good yields. In the reaction, about 1 mol hydrogen is evolved per silicon-hydrogen bond. Ammonia is generated simultaneously. The amount of hydrogen formed can be used in controlling the reaction.

The solvents used for carrying out the reaction comprise amines in first place; however, amides or sometimes alcohols may also be used. By way of example, the following solvents are mentioned: diethylamine, triethylamine, n-and i-butylamine, hexylamine, aniline and dimethylformamide. The reaction is performed either at room temperature or at temperatures above or below normal temperature.

The ammonium fluoride or ammonium-hydrogen fluoride may be used in technically pure state. For high yields, it may be advisable to predry the organohydrogensilane, the solvent and the ammonium-or ammonium-hydrogen fluoride. It is advantageous to use 1 mol ammonium fluoride or 0.5 mol ammonium-hydrogen fluoride per gram atom of hydrogen directly attached to silicon.

As mentioned before, the reaction proceeds under mild conditions, can be easily controlled by the amount of hydrogen evolved, and permits to obtain high yields. With substances containing silicon-hydrogen bonds the fluorination occurs without side reactions. The final product, which can be obtained free of the starting material, can be isolated readily in pure state.

The organofluorosilanes obtained lend themselves to many uses for further syntheses in the field of organosilicon chemistry.

In the following, the invention will be more fully described with reference to a number of examples, but it should be understood that these are given by way of illustration and not of limitation, and that many modifications may be made without departing from the spirit of the invention.

EXAMPLE 1

A flask equipped with reflux cooler and stirrer was charged with 2.96 g. (80 mMol) finely powdered ammonium fluoride dried over $P_2O_5$, and 30 ml. diethylamine, dried over $CaH_2$. From a dropping funnel, 15.87 g. (80 mMol) methyldiphensylsilane, $CH_3(C_6H_5)_2SiH$ dried with $CaH_2$ are added dropwise.

The reaction sets in immediately with strong gas evolution. The amount of gas evolved is collected and used for controlling the reaction.

After the entire amount of silane has been added and gas evolution has stopped, which is approximately after 15 minutes, the product which is clear like water is collected by suction through a glass frit and the filtrate is distilled. The yield in methyldiphenylfluorosilane is between 90 and 100 percent by weight.

Boiling point 0.35=83.5° to 84° C.; analysis for $C_{13}H_{13}FSi$: found F 8.6 percent, Si 12.8 percent; calc. F 8.78 percent, Si 12.98 percent.

EXAMPLE 2

The procedure of example 1 is followed with the exception that instead of ammonium fluoride, ammonium-hydrogen fluoride is used as reactant for the fluorination of methyldiphenylsilane. In that case, instead of a mol per mol amount of the reactants, half a mol of ammonium-hydrogen fluoride is used per mol of the silane. In figures, this amount to 2.28 g. ammonium-hydrogen fluoride for 15.87 g. methyldiphenylsilane.

In that case, too, the reaction sets in immediately and is completed after about 15 minutes. The yield of methyldiphenylfluorosilane is between 90 and 100 percent by weight. Boiling point of the product and analysis are the same as for example 1.

In a manner analogous to the one described above, one obtains $(C_5H_{11})_2SiF_2$ from diamyldihydrogensilane $(C_5H_{11})_2SiH_2$, likewise at room temperature, and triethylfluorosilane $(C_2H_5)_3SiF$ from triethylhydrogensilane $(C_2H_5)_3SiH$ produced at the boiling point of the solvent. The solvent was diethylamine boiling at 56° C.

EXAMPLE 3

A stirring vessel as described in example 1 was charged with 12.98 g. (80 mMol) methyldiisopropoxysilane $CH_3(i-C_3H_7O)_2SiH$ in mixture with 30 ml. diethylamine dried over $CaH_2$. From a powder-feeding funnel, 2.96 g. (80 mMol) finely powdered ammonium fluoride dried over $P_2O_5$ are added in doses at room temperature while stirring. Vigorous gas evolution sets in immediately and the reaction is rapidly completed. The solution, resembling clear water, is passed with suction through a glass frit and the filtrate is distilled.

The yield in methyldiisopropyloxyfluorosilane $Ch_3(i-C_3H_7O)_2SiF$ is between 80 and 90 percent by weight.

Boiling point $=105.5°$ C.; analysis for $C_7H_{17}O_2SiF$: found F 9.55 percent, Si 16.2 percent; calc. F 10.53 percent Si 15.5 percent.

EXAMPLE 4

A vessel equipped with stirrer as described in example 1 was charged with 29.67 g. (100 mMol) tris(trimethylsiloxy)hydrogensilane $[(CH_3)_3SiO]_3SiH$ in mixture with 30 ml. butylamine dried over $CaH_2$. From a powder-feeding funnel, 3.7 g. (100 mMol) finely powdered ammonium fluoride dried over $P_2O_5$ are added in doses at room temperature while stirring. Vigorous gas evolution sets in immediately; the reaction is completed after about 8 hours. The solution, resembling clear water, is passed with suction through a glass frit and the filtrate is distilled.

The yield in tris(trimethylsiloxy)fluorosilane $[(CH_3)_3SiO]_3SiF$ is between 50 and 60 percent.

Boiling point $=108.5°$ C.; analysis for $C_9H_{27}O_3FSi_4$: found F 6.28 percent, Si 35.70 percent; calc. F 6.03 percent, Si 35.70 percent.

EXAMPLE 5

A vessel equipped with stirrer as described in example 1 was charged with 8.85 g. (49 mMol) n-butyl-(anilino)-dihydrogensilane $C_4H_9(C_6H_5NH)SiH_2$ in mixture with 30 ml. freshly distilled aniline dried over $CaH_2$. From a powder-feeding funnel, 3.7 g. (100 mMol) finely powdered ammonium fluoride dried over $P_2O_5$ are added in doses at room temperature while stirring. Vigorous gas evolution sets in immediately; the reaction is complete after about 15 minutes.

The n-butyl-(anilino)-difluorosilane $C_4H_9(C_6H_5NH)SiF_2$ boils at $120°$ C./1 mm. and was obtained in a yield of 45 percent.

Analysis for $C_{10}H_{15}F_2NSi$: found F 17.5 percent, N 6.7 percent; calc. F 17.64 percent, N 6.5 percent.

It should be understood, of course, that the foregoing disclosure relates only to preferred embodiments of the invention and that it is intended to cover all charges and modifications of the examples described which do not constitute departures from the spirit and scope of the invention as set forth in the appended claims.

What we claim is:

1. A process for preparing organofluorosilanes of the general formula $R_a R'_b Si F_{4(a+b)}$ wherein $a$ to 2; to 3; $(a+b)$ than 4; R represents lower alkyl; R' stands for phenyl, isopropoxy, trimethylsiloxy and anilino, which process comprises reacting hydrogen-silanes of the general formula $R_a R'_b Si H_{4(aaob)}$ wherein $R_a$, $R'_b$ and $(a+b)$ have the same meaning as above, with ammonium fluoride or ammonium-hydrogen fluoride, whereby hydrogen linked to Si is exchanged by F, while the R—Si and R'—Si bonds are unaffected.

2. The process as defined in claim 1, wherein the hydrogen-silanes to be fluorinated are reacted with ammonium fluoride in a ration of 1 mol ammonium fluoride per gram atom of hydrogen attached to Si.

3. The process as defined in claim 1, wherein the hydrogen-silanes to be fluorinated are reacted with 0.5 mol ammonium-hydrogen fluoride per gram atom of hydrogen attached to Si.

4. The process as defined in claim 1, wherein the fluorination reaction is carried out in a solvent selected from the group consisting of amines and amides.

5. The process as defined in claim 4, wherein the reactants are dried before being introduced into the reaction.

6. The process as defined in claim 1, wherein the fluorination reaction is carried out at room temperature.

7. The process as defined in claim 1, wherein the fluorination reaction is carried out at temperatures in the range of $20°$ to $60°$ C.

UNITED STATES PATENT OFFICE
CERTIFICATE OF CORRECTION

Patent No. 3,621,045     Dated November 16, 1971

Inventor(s) R. Muller et al.

It is certified that error appears in the above-identified patent and that said Letters Patent are hereby corrected as shown below:

In the Abstract (on the front page), line 2 thereof, correct the formula to read -- $R_a R'_b Si F_{4-(a+b)}$ --; and change "represent" to -- represents --.

Claim 1 (in column 4, lines 16 through 24), complete and change to read:

-- 1. A process for preparing organofluorosilanes of the general formula $R_a R'_b Si F_{4-(a+b)}$ wherein $\underline{a}$ represents 0 to 2; $\underline{b}$ represents 1 to 3; (a+b) is smaller than 4; R represents lower alkyl; R' stands for phenyl, iso-propoxy, trimethylsiloxy and anilino, which process comprises reacting hydrogen-silanes of the general formula $R_a R'_b Si H_{4-(a+b)}$ wherein $R_a$, $R'_b$ and (a+b) have the same meaning as above, with ammonium fluoride or ammonium-hydrogen fluoride, whereby hydrogen linked to Si is exchanged by F, while the R—Si and R'—Si bonds are unaffected. --

Signed and sealed this 23rd day of May 1972.

(SEAL)
Attest:

EDWARD M. FLETCHER, JR.
Attesting Officer

ROBERT GOTTSCHALK
Commissioner of Patents